3,088,795
CONTROLLING CORROSION IN WET GAS
COLLECTION SYSTEMS
Joseph F. Chittum, Whittier, Calif., assignor to California Research Corporation, San Francisco, Calif., a corporation of Delaware
No Drawing. Filed Mar. 23, 1960, Ser. No. 16,912
5 Claims. (Cl. 21—2.7)

This invention relates to an improved method of operating a wet gas collection system and pertains more particularly to an economic method of controlling corrosion in the pipeline of a system used in oil fields to collect compress and transport moist wet gas to central processing plants.

In oil fields wet gas is produced from wells usually from the annulus surrounding the tubing string from which liquid petroleum is withdrawn. Such gas contains some entrained condensable hydrocarbons such as propanes and butanes which are sufficiently valuable to collect and recover. Also such gas normally contains small amounts of water and carbon dioxide. The gas is usually taken from several wells and fed into a compressor where the pressure is raised to about 50–1000 p.s.i. The wet gas heated by the compression and above its water dew point, is discharged from the compressor through a pipeline transporting the gas to a central treating or natural gasoline plant for recovering the valuable products.

Unless the gas is dehydrated, such pipelines transporting the gas from the compressor are subject to severe corrosion problems, since downstream from the compressor the hot gas gradually cools and water condenses out for a considerable length of the pipeline. Condensed water accumulates in the low spots called "drips" in the pipeline and is withdrawn therefrom, sometimes periodically and/or automatically. It will be appreciated that with moist gas obtained from the various wells, a substantial quantity of water is present in gas flowing in the pipeline and a large volume of condensate will accumulate in the "drips" downstream from the compressor. However, the gas passing the "drips" nearest the compressor is saturated at a temperature which may be 15 to 25° higher than the prevailing ground temperature. Since the gas temperature declines with greater rapidity than the pressure, condensation will continue and liquid water will accumulate at low points where it may or may not be removed by "drips." Gas passing over these accumulations of water is saturated with water vapor at the prevailing temperature and pressure at that point so long as the liquid water phase remains. When water condenses in the pipeline system severe corrosion occurs through the combination of the water and carbon dioxide which is usually present in amounts ranging from about 0.5 to 2%, or sometimes more.

Heretofore it has been proposed to introduce liquid solutions of corrosion inhibitors at high points in the pipeline and allow such solutions to flow down to the low spots to control corrosion to a condensation of water in the presence of carbon dioxide. Other proposals to avoid the corrosion are even more expensive in that they either require elaborate dehydration systems near the compressors or extensive insulation of pipeline from the compressor to the treating plant to keep the gas at its high temperature throughout the pipeline system. Details of the disadvantages for various kinds of dehydration systems are listed on pages 350 to 354 in the 1950 McGraw-Hill Co. publication in the Chemical Engineering Series entitled "Natural Gas and Natural Gasoline," by R. L. Huntington.

If one attempts to control the corrosion downstream from the compressor in a pipeline by introducing a solution or spray of an aqueous water soluble corrosion inhibitor it is found that corrosion is controlled only for a relatively short distance from the point of introduction and down to the next low spot where the condensate collects.

According to the present invention a more economical control of corrosion than before obtained results from introducing into the pipeline downstream from the compressor and ahead of the point in the pipeline where condensation of water commences, a fine mist of an oil solution of an oil soluble corrosion inhibitor. It is found that not only is the corrosion in the section of the pipeline immediately following the point of initial condensation of water reduced, but the corrosion past the first low point is also controlled. By this method the corrosion is controlled for greater distance downstream from the compressor than heretofore deemed possible by one injection. A preferred embodiment of the present invention comprises also introducing into the pipeline further downstream at the point where the condensate from the moist wet gas has a water content in the range of about 40 to 60% a fine mist of an oil solution of a vapor phase inhibitor such as morpholine or the lower molecular weight imidazolines. Another special and preferred feature of the present invention comprises introducing into the pipeline still further downstream where the condensate has a water content of less than 25% a fine mist of an aqueous solution of a water soluble corrosion inhibitor such as sodium arsenite.

Having briefly described the method of the present invention I should like to point out that this method provides a more economical method of controlling corrosion in the pipeline after the compressor in a wet gas collection system and moreover, controls the corrosion throughout a greater length of the pipeline than heretofore obtained in such a simple manner. It will be seen that the corrosion control is not limited to the low spots and the portion of the pipeline immediately ahead of the low spots where the main prtion of the water condenses and collects. The present method controls the corrosion not only in the severe corrosion zone ahead of the low spots where the water accumulates, but in the portion of the pipeline after the low points where the corrosion is less severe but still a major problem to control.

In such systems, the moist, wet gas is discharged from the compressor at elevated pressures such as 50–1000 p.s.i. and elevated temperatures such as 250 to 350° F. It will also be observed that in such moist, wet gas transporting pipelines, the point at which water begins to condense out of the moist, wet gas downstream from the compressor will depend upon a number of factors including the temperature surrounding the pipeline as well as the water content of gas. Where the pipeline is exposed above ground the range of temperatures surrounding the pipeline will be greater throughout the year and hence it is advisable to determine the point of initial water condensation for the lowest expected temperature throughout the year and for the highest water content of the gas expected to be encountered. It further will be obvious that during the life of an oil field it often happens that the water content of such gas will increase and hence it may be necessary to move the point of injection of the oil solution of oil soluble corrosion inhibitor closer to the downstream side of the compressor.

The primary treatment is for the section in the pipeline downstream from the compressor where the major proportion of the condensate is water. The initial point of water condensation may vary from a short distance up to one half to two miles from the compressor discharge, depending upon the temperature and water content. In this first part of the pipeline there may be, due to the natural terrain through which the pipeline runs, several low points or "drips" where condensed water tends to accumulate. At these spots the water is drained periodically and/or automatically, as is well known in the art. Ahead, and preferably just slightly ahead of the initial point of water condensation, is introduced a mist of an oil solution of an oil soluble inhibitor. The introduction, preferably continuously, of the fine mist of an oil solution of oil soluble inhibitor can be carried out in a suitable manner such as by placing a nozzle within the pipeline at the selected point, and with a feed line leading from an atomizer and supply of pressure gas and the oil soluble inhibitor solution. Alternatively, the inhibitor solution can be dropped on to a deflection plate placed in the pipeline in such a way that the flowing gas strips the solution from the plate to form a mist within the gas. In this first pipeline section extending from the point of inhibitor injection ahead of the initial water condensation, the point where the water content of the condensate drops to about 25% or at least to the range of 40 to 60%, it may be desirable to inject the fine inhibitor mist at several points in order to get adequate corrosion protection over the length of this section which may extend for several miles. The number of injection points will depend not only upon the velocity of the gas stream but also upon the degree of fineness of the mist and the temperature. Usually the larger proportion, such as 30 to 60%, of the inhibitor solution is introduced into the first injection point.

The carrier for the inhibitor may be one of several non-aqueous carriers in which the selected inhibitor is soluble. Suitable carriers will be kerosene, crude petroleum, diesel oil, various fractions of petroleum as well as special solvents. Low molecular weight aromatic solvents, particularly benzene and toluene are especially preferred since they have been found surprisingly effective in carrying the oil soluble inhibitor a considerable distance down the pipeline before condensing. Thus, for example, a line was operated with a gaseous mixture of nitrogen and a hexane fraction flowing through it under conditions such that the hexane condensed over a considerable length of the line, and when mists of toluene and kerosene were introduced into the gas stream in consecutive tests, it was found that the toluene mist carried considerably further than did the kerosene mist. Apparently, the toluene mist is not coalesced or scrubbed out even in the presence of condensing hexane which simulates the third, low-water, hydrocarbon-condensing section of the pipeline. Hence, an especially preferred aspect of this invention resides in the introduction throughout the several sections of the pipeline where moisture is condensing, of low-boiling aromatic hydrocarbon solution of an inhibitor.

After the water starts to condense, the water content of the condensate will gradually decrease along the length of the pipeline. For that section of the pipeline where the water content of the condensation is in the range of 40 to 60%, it is optional but preferable to introduce a mist of an oil solution of a vapor phase inhibitor such as morpholine or the lower molecular weight imidazolines. The point at which the water content of the condensate drops to 40 to 60% water may be on the order of several miles from the point of the initial condensation of water.

At the point further downstream from the discharge of the compressor where the water content of the condensate drops to about 25%, it is preferred to start introducing a fine mist of an aqueous solution of a water-soluble corrosion inhibitor since such mist will carry further downstream from the point of injection than an oil mist at this point in the system and hence will provide the greater degree of control over a greater length of the pipeline for a single injection. In a system where this third pipeline section extends for some distance, in some instances up to several miles, it may be desirable for complete corrosion control to inject the fine mist of an aqueous inhibitor solution at a number of additional points further downstream.

The mist introduced into each of said pipeline sections should be predominantly finer than 100 microns and preferably below 50 microns, depending upon the velocity of the gas stream in the pipeline. In any event the mist must be fine enough to be capable of being carried in a noncondensing system (i.e. where no condensable gas or water is present in the flowing gas) a considerable distance down the pipeline at the particular velocity of the gas flowing in the pipeline. For example, with the gas velocity at one or two feet per second a suitable mist would be composed of finely divided particles, the majority of which range from 5 to 25 microns. Mists of larger particle size can be tolerated with gases at higher velocities such as 4 to 5 feet per second.

The oil solutions and aqueous solutions should be injected into the respective pipeline sections to be treated at sufficient rate and at sufficient number of points throughout the respective sections to inhibit substantially the corrosion in the pipeline. The amount of inhibitor solutions will vary depending upon the conditions in the pipeline and the season of the year. (Less water will tend to condense in the summer than in the winter.) Normally the inhibitor solutions are injected in amounts sufficient to give one to ten parts per million of the active corrosion inhibitor in the water condensing in the section being treated by the injected mist. Likewise the distance between injection points will determine the amount of inhibitor that needs to be injected at each point.

Suitable oil soluble inhibitors for use in the oil solution to be introduced in the first treated section include the higher molecular weight amines and polyamines as well as the higher molecular weight nitroalkanes, the imidazolines, alkyl acid phosphate salts of polyamines, alkyl mercaptobenzothiazole, or neutralizing amines like decyl amine, dodecyl amine and morpholine, etc. Usually the higher boiling amines should contain at least about 10 carbon atoms per molecule, but no more than 20 carbon atoms per molecule. Also cyclic amines such as cyclohexyl amines having aliphatic side chains such as an octyl radical may be used. Various heterocyclic amines such as 2-heptadecyl imidazoline may also be employed. As an example of the preferred straight chain aliphatic amines may be mentioned octadecyl amine. Particularly effective are the polyamines having two or more amino groups located at one end of at least one long hydrocarbon chain. Suitable fatty polyamines are obtained under the trade marks Duomeen-T, Duomeen-S, and Duomeen-C. In Duomeen-T the long hydrocarbon chain is derived from tallow acids whereas in Duomeen-S and Duomeen-C the acids are derived respectively from soya bean oil acids and coconut oil acids. Also suitable are various derivatives of polyalkylene polyamines such as the completely acylated polyalkylene polyamine compounds which include at least one long chain amide group formed from a high molecular weight carboxylic acid such as oleic acid. Typical of polyamides of high molecular weight carboxylic acids and polyamines acylated with mixtures of high molecular weight and low molecular weight carboxylic acids are the following: tetralauroyl triethylene-tetramine, tetraoleoyltriethylenetetramine, tristcaroyldiethylenetriamine, mono-oleolyltriacetamide of triethylenetetramine, monosterolyltriacetamide of triethylenetetramine, and the like. Also suitable are the alkyl acid phosphate salts of N-alkyl-diamino-alkanes, such as for example, mono-octyl acid orthophosphate salt of N-tallow-1, 3-diamino-propane, dioctyl acid orthophosphate salt of N-tallow-1, 3-diaminopropane and similar salts such as where the alkyl group in the acid phosphate can be nonyl, undecyl, dodecyl, octadecyl and like groups and the tallow portion (which is derived from tallow fatty acids as in Duomeen T) can be other long hydrocarbon chains such as derived from soya bean oil acids, coconut oil acids, and the like. Appropriate nitroalkanes are 2-nitrooctane, 2-nitropropane, 1-nitropropane and nitroethane, etc. Suitable imidazolines include the condensation products of polyalkylene polyamines with various higher molecular weight fatty acids such as ricinoleic, oleic, tallow, stearic and like acids. These inhibitors are used in the oil solutions in various amounts ranging from 1–5% up to their limits of oil solubility, the more concentrated solutions being preferably used when the injected mist is in the finest particle size, since thereby corrosion control is effected over the greatest distance.

In the preferred form of the pipeline corrosion control method, the intermediate or second section of the pipeline is treated with a fine mist of an oil solution of a vapor phase or relatively volatile corrosion inhibitor. The advantages of such treatment are that the inhibitor will be carried farther along the pipeline from each point of injection than if the inhibitor were injected as either an oil solution or aqueous solution. Suitable volatile corrosion inhibitors for this purpose include morpholine as well as the lighter amines such as the aliphatic monoamines containing from one to six carbon atoms including, for example, propylamine, butylamine, pentylamine, etc.

It will be noted that the oil soluble corrosion inhibitors used in the first and second zones of treatment are relatively strongly polar compounds which will migrate to the oil-water interfaces and water-iron interfaces where the corrosion is likely to occur.

For use in the third section of the pipeline, aqueous solutions of the following water-soluble corrosion inhibitors may be employed: arsenous compounds, particularly the alkali metal arsenites with or without added alkali metal hydroxides and/or ethylene glycol, phosphates, including the polyphosphates and orthophosphates, cyanides including complex cyanides, and organic nitriles, quaternary ammonium salts such as a $C_{18}$-alkyl trimethyl ammonium chloride commercially known as Arquad S and the like. As polyphosphates may be mentioned hexametaphosphate, tripolyphosphate, pyrophosphates and the various glassy polyphosphates commercially available. As complex cyanides, sodium and potassium ferrocyanide or ferricyanide are illustrative; the ferrocyanides are preferably used in combination with water soluble borate salts such as sodium borate. Chromates such as sodium dichromate and the like are not ordinarily desirable because of adverse side effects such as emulsion formation. The alkali metal nitrites such as sodium nitrite, with or without added caustic such as sodium hydroxide, may sometimes be used but ordinarily require excessive amounts for adequate corrosion control. Sometimes sodium mercaptobenzotriazole or the like can be used. Often found to be quite effective is an aqueous solution of a caustic such as sodium hydroxide and/or lower molecular weight amines such as propylamine with or without polyphosphates such as hexametaphosphate.

To illustrate further the improved method of the present invention, reference is made to the following pipeline system for collecting moist, wet gas from a number of wells. Therein, thirteen compressor stations drawing gas through various feeder lines step up the pressure to about 460–470 p.s.i. and discharge the compressed and uncooled gas at a rate of 70,000,000 cu. ft. per day into two pipelines which are above ground and extend about 23 miles to four treating plants. In the pipeline system there are 91 "drips" or low spots from which 10–30 gallons of water are withdrawn per day from each "drip," the amount of water withdrawn totalling 1500 lbs. per day on the average. The point of initial condensation of water is about 1 mile downstream from each compressor station. Normally the water content of the condensate remains above 50% for the next 5 miles and thereafter there is a section of about another 5 miles wherein the water content of the condensate gradually decreases to about 25%. In the remaining last section of the pipeline the condensate is mainly hydrocarbon but with a small amount (i.e. 1–2%) of water remaining in the condensate shortly before the gas finally passes into the treating plant.

For treating the whole of such pipeline system in accordance with a preferred form of the present invention a total of about two pounds per day of active inhibitors can be used. Into the first section of the pipeline and ahead of the initial condensation of water is introduced, as described above, a fine mist, having a particle size predominantly in the range of 15–50 microns, of an oil-soluble corrosion inhibitor such as an alkylimidazoline. Such inhibitor in 1–10% solution in the low boiling aromatic hydrocarbon, is introduced at a plurality of points throughout the major portion of the pipeline with the greatest amount being introduced at the first injection point. Thus, the inhibitor mist might be injected into the first point in each line at the rate of 10 lbs. per day of solution and the remainder of the 20 lbs. total being introduced at 3 additional points in each line spaced about 4 miles apart downstream.

In another preferred form of the invention, the above described pipeline of the moist, wet gas gathering system is treated to control corrosion as follows: Into the first normally corroding section of the pipeline, namely, from the injection point ahead of initial water condensation downstream to the point at which the water content of the condensate drops to about 50%, is injected through 2 equally spaced injection points about one lb. per day, on an active inhibitor basis, of alkylimidazoline along with sufficient kerosene to make a 1–10% solution of the alkylimidazoline. Into the second section of the pipeline, namely, over the distance wherein the water content of the condensate is from about 50% to about 25%, there is injected through a series of 2 injection points 5 lbs. per day of a mist of 10% kerosene solution of morpholine. Into the third and remaining section of the pipeline is introduced through 2 equally spaced points 10 lbs. per day of an aqueous solution containing 5% sodium arsenite plus 5% sodium hydroxide. In each instance the mist has a sufficiently small particle size such as 10–30 microns to allow it to be carried downstream so that coverage throughout the normally corroding sections of the line is obtained.

Alternate combinations are as follows:

A. Into the first and immediate section, a total of 20 lbs. per day of a 10% benzene solution of N-tallow-1,3, diaminopropane; and into the last section having predominantly hydrocarbon condensate, a total of 10 lbs. per day of an aqueous solution containing 2% sodium ferrocyanide and 6% sodium tetraborate.

B. Into the first section, 10 lbs. per day of a 25% hexane solution of Duomeen-T; into the second section, 10 lbs. per day of a 20% hexane solution of nitrobutane; and into the last section, 10 lbs. per day of an aqueous solution containing 10% ethylene glycol, 10% butylamines and 10% hexametaphosphate.

I claim:

1. The method of substantially reducing corrosion in a pipeline carrying moist wet gas at elevated temperature and pressure which comprises introducing a mist of an oil solution of an oil soluble corrosion inhibitor into the flowing moist, wet gas stream in a first section of said pipeline from the point of initial condensation of water to the point downstream where the water content of the condensate has decreased to about 25%, and introducing a mist of an aqueous solution of a water soluble corrosion inhibitor into the flowing moist, wet gas stream in the downstream section of said pipeline having an aqueous condensate containing less than 25% water.

2. The process of claim 1 wherein said oil soluble corrosion inhibitor introduced into said first section is an aliphatic amine having at least one hydrocarbon chain of more than 7 carbon atoms and said aqueous solution of water soluble corrosion inhibitor is an aqueous alkaline solution of alkali metal arsenite.

3. The method of substantially reducing corrosion in a pipeline carrying moist wet gas at elevated temperature and pressure which comprises introducing a mist of an oil solution of an oil soluble corrosion inhibitor into the flowing moist, wet gas stream in a first section of said pipeline from the point of initial condensation of water to the point downstream where the water content of the condensate has decreased to 40 to 60%, introducing into the flowing moist, wet gas stream in the next second downstream section of said pipeline extending to the point where the water content of the condensate has decreased to about 25% a mist of an oil solution of a relatively volatile corrosion inhibitor, and introducing a mist of an aqueous solution of a water soluble corrosion inhibitor into the flowing moist, wet gas stream in the third downstream section of said pipeline having an aqueous condensate containing less than 25% water, said introductions of inhibitors in each section being through a sufficient number of points, and the particle size of said mist being sufficiently fine in relation to the velocity of the flowing gas in said pipeline to maintain a corrosion inhibiting amount of said mist through the respective sections of said pipeline.

4. The method of operating a moist wet gas collection system wherein said gas is obtained from a plurality of wells and is compressed without cooling to a pressure ranging from 50 to 1000 p.s.i. and has a water dew point above the ambient temperature of said pipeline, the improvement which comprises controlling the corrosion in said pipeline by introducing a mist of an oil soluble corrosion inhibitor dissolved in a low boiling aromatic hydrocarbon into the flowing moist, wet gas stream in said pipeline downstream from the point of compression and at least ahead of the point where water begins to condense, and also introducing a mist of said oil soluble corrosion inhibitor in an aromatic hydrocarbon solvent at a plurality of points in the pipeline downstream from the initial point of injection, said introduction of inhibitor being through a sufficient number of points and the particle size of said mist being sufficiently fine in relation to the velocity of the gas flowing in said pipeline to maintain a corrosion inhibiting amount of said mist through a substantial portion of the corroding sections of said pipeline.

5. The method of substantially reducing corrosion for substantial sections of a pipeline carrying moist, wet gas at elevated temperature and pressure which comprises introducing a mist of an oil solution of an oil-soluble corrosion inhibitor into the flowing moist, wet gas stream in that section of said pipeline from the point of initial condensation of water to the point downstream where the water content of the condensate from the flowing moist, wet gas has decreased to about 25%, the particle size of said mist being sufficiently fine in relation to the velocity of the gas flowing in said pipeline to maintain a corrosion inhibiting amount of said mist throughout a substantial portion of the aforesaid section of said pipeline.

References Cited in the file of this patent

UNITED STATES PATENTS

| | | |
|---|---|---|
| 2,643,227 | Hughes et al. | June 23, 1953 |
| 2,684,333 | Rohrback | July 20, 1954 |
| 2,728,643 | Vaughn | Dec. 27, 1955 |
| 2,795,560 | Williams | June 11, 1957 |
| 2,889,334 | Hughes | June 2, 1959 |
| 2,913,305 | Anderson | Nov. 17, 1959 |
| 2,972,861 | Davies | Feb. 28, 1961 |
| 2,996,351 | Stobe | Aug. 15, 1961 |

OTHER REFERENCES

Shell Oil Company, Maritime Reporter, May 15, 1954, p. 1.

"Condensate Well Corrosion," Natural Gasolene Association of America, Tulsa, Oklahoma, 1953, pp. 83–86.

"Industry Fights Corrosion," Corrosion Technology, The Journal of Corrosion Control, Prevention, Engineering, and Research, Leonard Hill House, London, 1958, p. 4.